United States Patent Office 3,816,611
Patented June 11, 1974

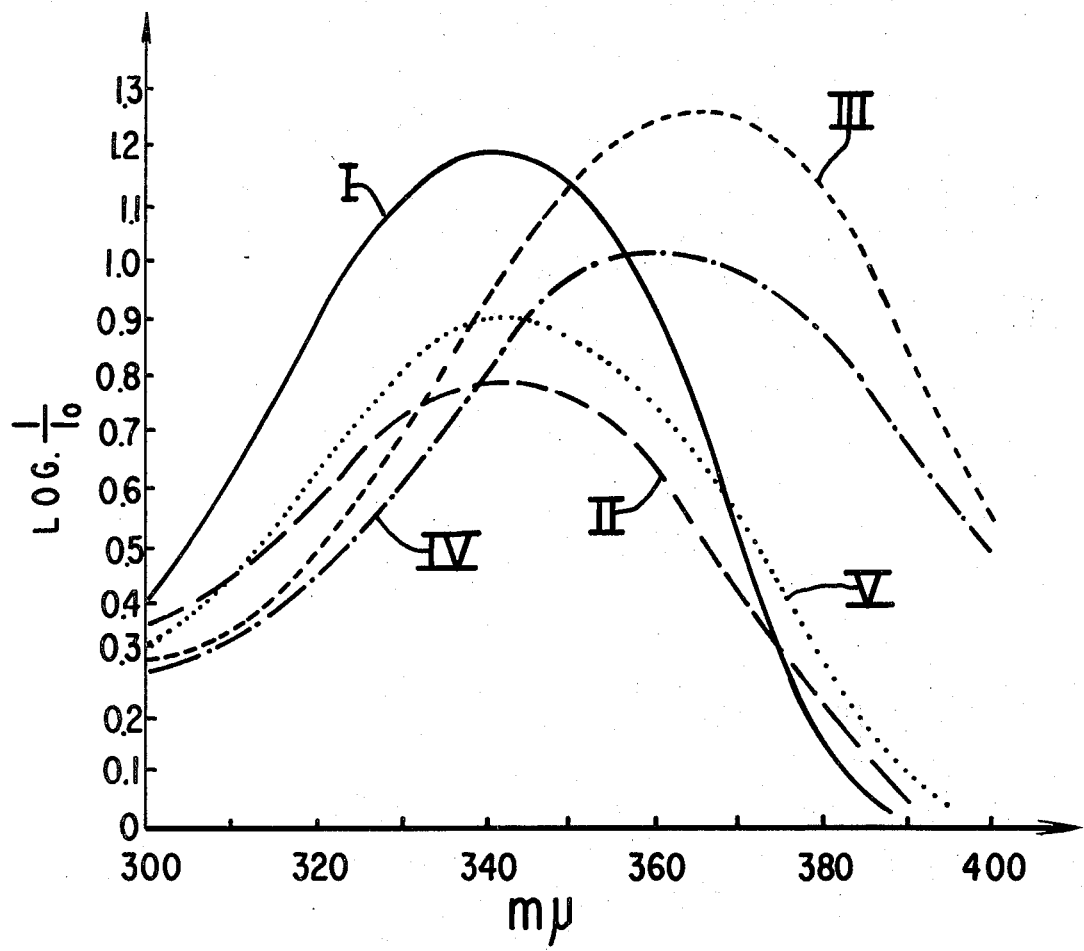

3,816,611
ULTRAVIOLET LIGHT-ABSORBING COMPOSITIONS COMPRISING A 1-(PHENYL OR PYRIDYL)-3-PYRIDYL-1,3-PROPANEDIONE
Hans Eberhardt and Albert Reuter, Biberash an der Riss, Germany, assignors to Boehringer Ingelheim G.m.b.H., Ingelheim am Rhein, Germany
Filed Feb. 4, 1972, Ser. No. 223,537
Claims priority, application Germany, Feb. 8, 1971, P 21 05 672.4
Int. Cl. A61l 23/00
U.S. Cl. 424—59                6 Claims

ABSTRACT OF THE DISCLOSURE

Ultraviolet light-absorbing compositions comprising from 0.5 to 20% by weight, based on the total weight, of a compound of the formula

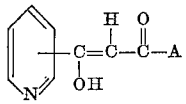

wherein A is pyridyl, phenyl, halo-phenyl, lower alkyl-phenyl or lower alkoxy-phenyl, or a tautomer thereof; the compositions are useful as cosmetic or dermatological preparations for protecting the skin against ultraviolet light, and also as light-protective impregnating agents for cardboard and similar packaging material.

This invention relates to novel ultraviolet light-absorbing compositions comprising a 1-(phenyl or pyridyl)-3-pyridyl-1,3-propanedione, as well as to a method of protecting the skin against ultraviolet light therewith.

BACKGROUND OF THE INVENTION

Although a number of different compounds have been used, or proposed for use, as light-screening agents, all of them have various disadvantages or shortcomings which limit their range of application. For instance, some of them are not sufficiently stable, either chemically or under exposure to sunlight, to remain unchanged over long periods of storage; others irritate the skin after repeated use; some of them screen out or absorb only a relatively narrow range of the ultraviolet light spectrum; and still others are not sufficiently soluble in alkanols or aqueous alkanols, which are conventional solvent media in the preparation of cosmetic and dermatological lotions and the like.

OBJECTS OF THE INVENTION

It is an object of the present invention to provide ultraviolet light-absorbing compositions which are stable, both chemically and under exposure to sunlight, and effectively absorb or screen out light over the UV-range of about 300 to 400 m$\mu$.

Another object of the present invention is to provide ultraviolet light-absorbing compositions which are non-irritating to the skin and even exhibit antiphlogistic properties.

A further object of the instant invention is to provide ultraviolet light-absorbing compositions which are suitable for cosmetic, therapeutic as well as industrial purposes, and the active ingredient of which is freely soluble in conventional solvents, such as alkanols and aqueous alkanols.

Still other objects and advantages of the invention will become apparent as the description thereof proceeds.

THE INVENTION

The above objects are achieved in accordance with the present invention by using as the ultraviolet light-absorbing active ingredient an effective amount of at least one compound of the formula

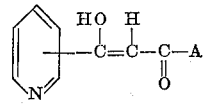

wherein A is pyridyl, phenyl, halo-phenyl, lower alkyl-phenyl or lower alkoxy-phenyl, or preferably a tautomeric form thereof of the formula

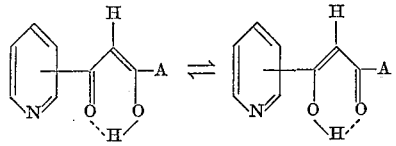

where A has the same meanings as in formula I.

Some of the compounds embraced by formula I are known compounds; for example, 1-phenyl-3-(3'-pyridyl)-1,3-propanedione is described in J.A.C.S. 57, 143 (1935). Other compounds of this class may be prepared by conventional methods, such as in a manner analogous to that disclosed in Helv. Chim. Acta 27, 1253 (1944) that is, by reacting a lower alkyl pyridine-carboxylate with a ketone of the formula

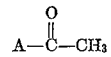

wherein A has the same meanings as in formula I, in the presence of a basic condensation agent.

The following examples illustrate the preparation of a few members of the class of compounds represented by formula I.

EXAMPLE 1

1-phenyl-3-(3'-pyridyl)-1,3-propanedione 288 gm. (2.4 mols) of acetophenone were added dropwise to a suspension of 188 gm. (2.4 mols) of sodium amide (50% solution in benzene) in 1300 ml. of absolute ether, while stirring, at a rate such that the ether just barely continued to boil. After all of the acetophenone had been added, the mixture was stirred for 30 minutes more, and then 180 gm. (1.2 mols) of ethyl nicotinate were added dropwise over a period of 15 minutes. The resulting mixture was stirred for 30 minutes at room temperature and then for three hours while refluxing. Thereafter, the reaction mixture was allowed to stand overnight at room temperature, then 150 ml. of water were added, and the precipitate formed thereby was collected by vacuum filtration and washed with 200 ml. of ether. The filter cake was stirred into 2 liters of water, the resulting aqueous solution was made weakly acid with concentrated hydrochloric acid, and the crystalline substance precipitated thereby was collected by vacuum filtration, washed first with saturated aqueous sodium carbonate, then with water and finally with petroleum ether, and recrystallized from methanol, yielding 270 gm. of 1-phenyl-3-(3'-pyridyl)-1,3-propanedione, M.P. 121° C.

EXAMPLE 2

Using a procedure analogous to that described in Example 1, 1-phenyl-3-(4'-pyridyl)-1,3-propanedione, M.P. 81° C., was prepared from acetophenone and ethyl isonicotinate.

EXAMPLE 3

Using a procedure analogous to that described in Example 1, 1-(p-bromo-phenyl)-3-(3'-pyridyl)-1,3-propanedione, M.P. 142–143° C., was prepared from p-bromo-acetophenone and ethyl nicotinate.

EXAMPLE 4

Using a procedure analogous to that described in Example 1, 1-(p-chloro-phenyl)-3-(3'-pyridyl)-1,3-propanedione, M.P. 154–155° C., was prepared from p-chloro-acetophenone and ethyl nicotinate.

EXAMPLE 5

Using a procedure analogous to that described in Example 1, 1-(p-methoxy-phenyl) - 3 - (3' - pyridyl) - 1,3-propanedione, M.P. 136° C., was prepared from p-methoxy-acetophenone and ethyl nicotinate.

EXAMPLE 6

Using a procedure analogous to that described in Example 1, 1-phenyl-3-(2'-pyridyl) - 1,3 - propanedione, M.P. 88° C., was prepared from acetophenone and ethyl picolinate.

EXAMPLE 7

Using a procedure analogous to that described in Example 1, 1-(p-bromo-phenyl)-3-(2'-pyridyl)-1,3- propanedione, M.P. 1220 C., was prepared from p-bromo-acetophenone and ethyl picolinate.

EXAMPLE 8

Using a procedure analogous to that described in Example 1, 1-(p-bromo-phenyl)-3-(4'-pyridyl)-1,3 - propanedione, M.P. 162° C., was prepared from p-bromo-acetophenone and ethyl isonicotinate.

EXAMPLE 9

Using a procedure analogous to that described in Example 1, 1-(m-tolyl)-3-(3'-pyridyl)-1,3-propanedione, M.P. 117–118° C., was prepared from m-methyl-acetophenone and ethyl nicotinate.

EXAMPLE 10

Using a procedure analogous to that described in Example 1, 1,3-bis-(3'-pyridyl)-1,3 - propanedione, M.P. 198° C., was prepared from 3-acetyl-pyridine and ethyl nicotinate.

The compounds of the formula I and their tautomeric forms Ia are stable, exhibit ultraviolet light-absorbing properties and antiphlogistic activities, and are freely soluble in lower alkanols and aqueous lower alkanols, such as isopropanol or aqueous isopropanol.

The ultraviolet light-screening activity was ascertained on rats which had been light-sensitized with chlorpromazine [see E.G. Jlung, Arch. klin. exp. Derm. 237, 501 (1970)] and the antiphlogistic activity was ascertained by means of the kaolin edema of the rat's hind paw [see Hillebrecht, Arzneimittelforschung 4, 607–614 (1954)].

The ultraviolet light-screening property of the compounds was also tested by passing ultraviolet light through a layer, 10 mm. thick, of a solution of various of the compounds in ethanol at a concentration of 10 mgm./liter, and measuring the amount of ultraviolet light within the wave-length range of 300 to 400 m$\mu$ which was absorbed. The results of these tests are shown in the attached drawing, which is a plot of the absorption characteristics of the tested solutions, where Curve I=1-phenyl-3-(3'-pyridyl)-1,3-propanedione;
Curve II=1-phenyl-3-(4'-pyridyl)-1,3-propanedione;
Curve III=1-(p-methoxy-phenyl)-3-(3'-pyridyl)-1,3-propanedione,
Curve IV=1-phenyl-3-(2'-pyridyl)-1,3-propanedione; and
Curve V=1,3-bis(3'-pyridyl)-1,3-propanedione.

The compounds of the formula I, or preferably their tautomeric form of the formula Ia, may be incorporated in conventional manner as active ingredients into a wide variety of conventional substrates or inert carrier compositions adapted for cosmetic or dermatologic applications, such as emulsions, oils, lotions, creams, gels, sprays or the like; the active ingredient concentration may range from 0.5 to 20% by weight, and preferably 2 to 8% by weight, based on the total weight of the composition. Such compositions containing one or more of only the compounds of the formula I or their tautomeric form effectively screen out ultraviolet light in the wave-length range of about 300 m$\mu$ and 400 m$\mu$. The range of the ultraviolet light wave-length absorbed by such compositions may be broadened by combining the active ingredient of the formula I or Ia with a lower alkyl ester of p-lower alkoxy-cinnamic acid, such as isopropyl p-methoxy-cinnamate, or a p-lower alkoxy-cinnamic acid amide. For example, a composition which contains 1-phenyl-3-(3'-pyridyl)-1,3-propanedione in combination with isopropyl p-methoxy-cinnamate effectively absorbs light in the ultraviolet range of 280 m$\mu$ to 400 m$\mu$.

The following examples illustrate a few cosmetic or dermatologic compositions comprising a compound of the formula I as an active UV-light-absorbing ingredient and represent the best modes contemplated of putting the invention into practical use. The parts are parts by weight.

EXAMPLE 11

Skin lotion

The lotion is compounded from the following ingredients:

| | Parts |
|---|---|
| 1-phenyl-3-(3'-pyridyl)-1,3-propanedione | 4.0 |
| Isopropyl p-methoxy-cinnamate | 2.0 |
| Lanette O [1] | 3.0 |
| Cremophor O [2] | 5.0 |
| Spermaceti | 9.0 |
| Cetiol V [3] | 1.0 |
| Isopropanol | 15.0 |
| Perfume oil | 0.3 |
| Distilled water, Q.s. ad | 100.0 |

[1] Mixture of cetyl and stearyl alcohols; a commercial neutral, skin-compatible, consistency-imparting factor for ointments, creams and emulsions.
[2] Long-chain, high-molecular, water-soluble, wax-like polyglycolether; a commercial cosmetic and pharmaceutical emulsifier for high-molecular alcohols, fatty acids, waxes, wool grease, spermaceti, etc.
[3] Mixture of esters of unsaturated fatty acids, mainly oleyl oleate; a commercial, skin-penetrating, low-viscosity liquid additive for cosmetic creams and the like.

Preparation: The Cremophor, the Lanette, the spermaceti and the Cetiol are admixed with each other, the mixture is heated to 75° C., the cinnamate and propanedione compounds are dissolved therein, and the distilled water at 75° C. is stirred into the solution. The perfume oil is dissolved in the isopropanol at 50° C., the resulting solution is stirred into the previously prepared mixture at 50° C., and the composition is cooled to room temperature and purged of air. The finished composition is a skin lotion which effectively screens out ultraviolet light in the range of 280 m$\mu$ to 400 m$\mu$.

EXAMPLE 12

Skin oil

The oil is compounded from the following ingredients:

| | Parts |
|---|---|
| 1 - (p - chloro-phenyl)-3-(3'-pyridyl)-1,3-propanedione | 6.0 |
| Cetiol | 30.0 |
| Vegetable oil | 30.0 |
| Perfume oil | 0.3 |
| Paraffin oil, Q.s. ad | 100.0 |

Preparation: The Cetiol, the vegetable oil and the paraffin oil are admixed with each other, the mixture is heated to 70° C., and the propanedione compound is dissolved therein. The solution is cooled to 30° C., and the perfume oil is stirred into it. The resulting composition is a skin oil which effectively absorbs ultraviolet light in the range of about 300 to 400 m$\mu$.

EXAMPLE 13

Aerosol spray

The spray composition is compounded from the following ingredients:

| | Parts |
|---|---|
| 1-(p-methoxy-phenyl)-3-(3'-pyridyl)-1,3-propanedione | 6.0 |
| Isopropyl myristate | 2.0 |
| Perfume oil | 0.3 |
| Isopropanol | 61.7 |
| Frigen 12 | 30.0 |

Preparation: The propanedione compound, the myristate and the perfume oil are dissolved in the isopropanol, the resulting solution is filled into aerosol cans, the aerosol spray valve is installed, and the propellant gas is introduced under pressure. The aerosol spray discharged from the container upon actuation of the valve is a solution which effectively absorbs ultraviolet light in the range of about 300 to 400 m$\mu$.

EXAMPLE 14

Skin cream

The cream composition is compounded from the following ingredients:

| | Parts |
|---|---|
| 1,3-bis-(3'-pyridyl)-1,3-propanedione | 4.0 |
| Isopropyl p-methoxy-cinnamate | 2.0 |
| Lanette N [1] | 10.0 |
| Cetiol | 10.0 |
| Paraffin oil | 15.0 |
| White vaseline | 2.0 |
| Benzalkonium chloride | 0.1 |
| Distilled water, Q.s. ad | 100.0 |

[1] Mixture of 9 parts Lanette O (see Example 11) and 1 part of the sodium salt of cetyl stearyl sulfuric acid ester (Lanette E); a commercial ointment and cream base.

Preparation: The distilled water is heated to 70° C. and the benzalkonium chloride is dissolved therein (solution I). The Lanette, the Cetiol, the paraffin oil and the vaseline are admixed with each other, the mixture is melted by heating to 70° C., and the propanedione compound and the cinnamate are dissolved in the molten mixture (solution II). Solution II is emulsified in solution I. The finished composition is a skin cream which effectively absorbs ultraviolet light in the range of 280 to 400 m$\mu$.

EXAMPLE 15

Gel

The gel composition is compounded from the following ingredients:

| | Parts |
|---|---|
| 1-(m-tolyl)-3-(3'-pyridyl)-1,3-propanedione | 8.0 |
| Carbopol 940 [1] | 1.0 |
| Triethanolamine | 1.0 |
| Isopropanol | 50.0 |
| Distilled water, Q.s. ad | 100.0 |

[1] Carboxypolymethylene; carboxyvinyl polymer of very high molecular weight; forms colloidal solutions with water; a commercial thickening agent for cosmetics.

Preparation: The Carbopol is dissolved in the distilled water (solution I). The propanedione compound and the triethanolamine are dissolved in the isopropanol (solution II). Solution II is stirred into solution I. The resulting composition is a dermatologic gel which effectively absorbs ultraviolet light in the range of 300 to 400 m$\mu$.

Analogous results are obtained when any one of the other propanedione compounds embraced by formula I is substituted for the particular propanedione in Examples 11 through 15. Likewise, the amount of active ingredient in these illustrative examples may be varied to achieve the percentage range set forth above, and the amounts and nature of the inert carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. The method of preventing ultraviolet light from reaching the skin, which comprises coating the skin with an effective sun-screening amount of an ultraviolet light-absorbing dermatological composition consisting essentially of an inert, dermatologically acceptable carrier and from 0.5 to 20% by weight, based on the total weight of said composition, of a compound of the formula

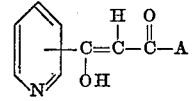

wherein A is pyridyl, phenyl, chloro-phenyl, bromo-phenyl, methoxy-phenyl or tolyl,
or a tautomer thereof.

2. The method of claim 1, wherein said compound is 1-phenyl-3-(3'-pyridyl)-1,3-propanedione.

3. The method of claim 1, wherein said compound is 1-phenyl-3-(4'-pyridyl)-1,3-propanedione.

4. The method of claim 1, wherein said compound is 1-(p-methoxy-phenyl)-3-(3'-pyridyl)-1,3-propanedione.

5. The method of claim 1, wherein said compound is 1-phenyl-3-(2'-pyridyl)-1,3-propanedione.

6. The method of claim 1, wherein said compound is 1,3-bis-(3'-pyridyl)-1,3-propanedione.

References Cited

UNITED STATES PATENTS 2,377,188  5/1945  Schwenk et al. _____ 424—59

OTHER REFERENCES

Nonhebel Tetrahedron, 1968, vol. 24, pp. 1869–1874.
Chemical Abstracts, 1963, vol. 59, p. 13913.
Estert et al., Chemical Abstracts, (1959), vol. 53, pp. 1335–1336.
Devitt et al. Chemical Abstracts (1962), vol. 57, p. 14189.
Sagarin Cosmetic Science and Technology (1957), pp. 199 and 200.

ALBERT T. MEYERS, Primary Examiner

D. R. ORE, Assistant Examiner

U.S. Cl. X.R.

424—47, 168